(12) United States Patent
Sanabria et al.

(10) Patent No.: US 7,606,824 B2
(45) Date of Patent: Oct. 20, 2009

(54) DATABINDING WORKFLOW DATA TO A USER INTERFACE LAYER

(75) Inventors: Andres Mauricio Sanabria, Sammamish, WA (US); Michael J. Harder, Bellevue, WA (US); Nikhil Kothari, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 196 days.

(21) Appl. No.: 11/273,366

(22) Filed: Nov. 14, 2005

(65) Prior Publication Data

US 2007/0112829 A1 May 17, 2007

(51) Int. Cl.
*G06F 17/00* (2006.01)
(52) U.S. Cl. .......................................... 707/102; 705/8
(58) Field of Classification Search ................ None
See application file for complete search history.

(56) References Cited

U.S. PATENT DOCUMENTS

| | | | | |
|---|---|---|---|---|
| 6,158,044 | A | 12/2000 | Tibbetts ......................... | 717/1 |
| 6,341,314 | B1 | 1/2002 | Doganata et al. ............. | 709/229 |
| 6,405,210 | B1 | 6/2002 | Doyle et al. ................. | 707/103 |
| 6,792,607 | B1* | 9/2004 | Burd et al. ................... | 719/316 |
| 2002/0101448 | A1 | 8/2002 | Sanderson .................. | 345/762 |
| 2002/0184610 | A1 | 12/2002 | Chong et al. ................ | 717/109 |
| 2003/0023773 | A1* | 1/2003 | Lee et al. ..................... | 709/328 |
| 2003/0195782 | A1* | 10/2003 | Sakaguchi et al. ............. | 705/7 |
| 2003/0234815 | A1 | 12/2003 | Delaney ..................... | 345/762 |
| 2004/0021679 | A1 | 2/2004 | Chapman et al. ............ | 345/700 |
| 2004/0103073 | A1 | 5/2004 | Blake et al. .................. | 707/1 |
| 2005/0004893 | A1 | 1/2005 | Sangroniz ..................... | 707/3 |
| 2005/0066287 | A1* | 3/2005 | Tattrie et al. ................. | 715/769 |
| 2005/0096932 | A1 | 5/2005 | Fernandez et al. ............. | 705/1 |
| 2005/0097536 | A1 | 5/2005 | Bernstein et al. ............ | 717/156 |
| 2006/0229924 | A1* | 10/2006 | Aron et al. ..................... | 705/8 |

FOREIGN PATENT DOCUMENTS

GB 2 396 928 A 7/2004

(Continued)

OTHER PUBLICATIONS

"Managing data with the DataSet component (Flash Professional only)"; http://livedocs.macromedia.com/flash/mx2004/main_7_2/00000455.html; 5 pgs.

(Continued)

*Primary Examiner*—Pierre M Vital
*Assistant Examiner*—Truong V Vo
(74) *Attorney, Agent, or Firm*—Merchant & Gould; Ryan T. Grace

(57) ABSTRACT

In a workflow system data is exchanged using databinding constructs between the workflow and user interface layer. During an execution of a workflow a user interface instance is activated in anticipation of a user input event. The workflow is suspended and data for populating the user interface instance is provided to the user interface layer using a databinding construct from the workflow. Upon receiving user input, another instance of the workflow is loaded and data associated with the user input provided from the user interface to the workflow employing a databinding construct such that the other instance of the workflow is executed with the data associated with the user input.

19 Claims, 9 Drawing Sheets

FOREIGN PATENT DOCUMENTS

| | | |
|---|---|---|
| WO | WO 00/39713 | 7/2000 |
| WO | WO 01/24037 A2 | 4/2001 |

OTHER PUBLICATIONS

"Oracle9i Warehouse Builder 9.2"; http://www.oracle.com/technology/products/warehouse/htdocs/datasheet92.htm; 9 pgs.

"Chapter 1 About Workflow"; http://www.novell.com/documentation/director4/docs/help/books/wfAbout.html; 5 pgs.

"i2 Master Data Management"; http://www.i2.com/assets/pdf/PDS_mdm_v61_pds7210_070704.pdf; 3 pgs.

Mark Seemann; "Isolate Your UI Code Before It Invades Your Business Layer"; MSDN Magazine Aug. 2005; http://msdn.microsoft.com/msdnmag/issues/05/05/UIPApplicationBlock/default.aspx; 9 pgs.

"Skelta Workflow.NET"; http://www.skelta.com/; 2 pgs.

* cited by examiner

```
                                                                             600
                                                                        ┌───
      ┌─<asp:UIFlowContainer runat="server"
 602 ─┼─ WorkflowName="SendMail" WorkflowTypeName="SampleWebSite.SendMailWorkflow">
      604 ┌<StartTemplate>
         │   <asp:ActionButton runat="server" Text="Send an EMail" CausesValidation="false">
         │     <ClickActions>
   606 ─┤       <asp:UIFlowAction Type="StartWorkflow" />
         │     </ClickActions>
         │   </asp:ActionButton>
         └</StartTemplate>
          ┌<CompleteTemplate>
          │   <b>Your mail was sent.</b><br />
          │   <asp:ActionButton runat="server" Text="Send another EMail" CausesValidation="false">
          │     <ClickActions>
   608 ─┤       <asp:UIFlowAction Type="StartWorkflow" />
          │     </ClickActions>
          │   </asp:ActionButton>
          └</CompleteTemplate>
         ┌<Views>
         │   <asp:UIFlowView InteractionIdentifier="Compose">
         │     <ContentTemplate>
         │       <b>Compose Mail</b>                              610
         │       <tr>
         │         <td>
         │           <asp:Label runat="server" Text="To:" AssociatedControlID="toTextBox" />
         │         </td>
         │         <td>
         │           <asp:TextBox runat="server" id="toTextBox" Text='<%# Bind("To") %>' />
         │         </td>
         │         <td>                                            612
         │           <asp:RequiredFieldValidator runat="server"
         │             ValidationGroup="SendMail"
         │             ControlToValidate="toTextBox" Text="*" />
         │         </td>
         │       </tr>
         │       ...
         │       <tr>
         │         <td colspan="3" align="right">
   614 ─┤           <asp:ActionButton runat="server" Text="Submit" CausesValidation="false">
         │             <ClickActions>
         │               <asp:ValidationAction />
         │               <asp:UIFlowAction Type="ResumeWorkflow" ResumeAction="Submit" />
         │             </ClickActions>
         │           </asp:ActionButton>
         │           <asp:ActionButton runat="server" Text="Submit" CausesValidation="false">
         │             <ClickActions>
         │               <asp:UIFlowAction Type="CancelWorkflow" />
         │             </ClickActions>                              616
         │           </asp:ActionButton>
         │         </td>
         │       </tr>
         │     </ContentTemplate>
         │   </asp:UIFlowView>
         │   <asp:UIFlowView InteractionIdentifier="Options">
         │     <ContentTemplate>
         │       ...                                              618
         │     </ContentTemplate>
         │   </asp:UIFlowView>
         └</Views>
       </asp:UIFlowContainer>
```

*Fig. 6*

DATABINDING WORKFLOW DATA TO A USER INTERFACE LAYER

BACKGROUND

The concept of the state machine is a natural fit for many contemporary enterprise applications, particularly those that are process-oriented. The distinguishing characteristic of a process-oriented application is its movement over time from state to state, or put differently, its progression from milestone to milestone to an ultimate goal. An application that manages the processing of an insurance claim is a typical example. The insurance claim, over its lifetime, is passed from one person to another in a succession of approvals, and is defined at all times by how far it has reached. But not all enterprise applications qualify. For example, in an automated teller machine (ATM), which lets users query their account balance, withdraw cash, deposit checks and cash, and pay bills, any sense of process is extremely short-lived and inessential. An ATM is an online transaction processor, not a process-oriented application.

The popularity of workflow application frameworks indicates not only that process-oriented applications abound, but also that high-level modeling languages are increasingly being used to develop these applications. Besides state machines, workflow technology is an obvious implementation choice for business processes because a workflow is often the most similar representation of the process.

SUMMARY

Databinding constructs are employed for exchanging data between workflow and user interface layers. Execution of a workflow instance is suspended in anticipation of a user input event, and an associated user interface instance is activated. Data for populating the user interface instance may be provided to the user interface layer using a databinding construct from the workflow instance. Upon receiving the user input, another instance of the workflow may be loaded and data associated with the user input from the user interface provided to the other workflow instance employing another databinding construct such that the workflow is executed with the data associated with the user input.

The databinding constructs may include one type for transferring data from the workflow to the user interface and another type for transferring data in both directions between the workflow and the user interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6 illustrates example code for an electronic mail application using workflow and user interface instances;

DETAILED DESCRIPTION

Embodiments of the present disclosure now will be described more fully hereinafter with reference to the accompanying drawings, which form a part hereof, and which show, by way of illustration, specific exemplary embodiments for practicing the invention. This disclosure may, however, be embodied in many different forms and should not be construed as limited to the embodiments set forth herein; rather, these embodiments are provided so that this disclosure will be thorough and complete, and will fully convey the scope to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Illustrative Operating Environment

Figure 1:
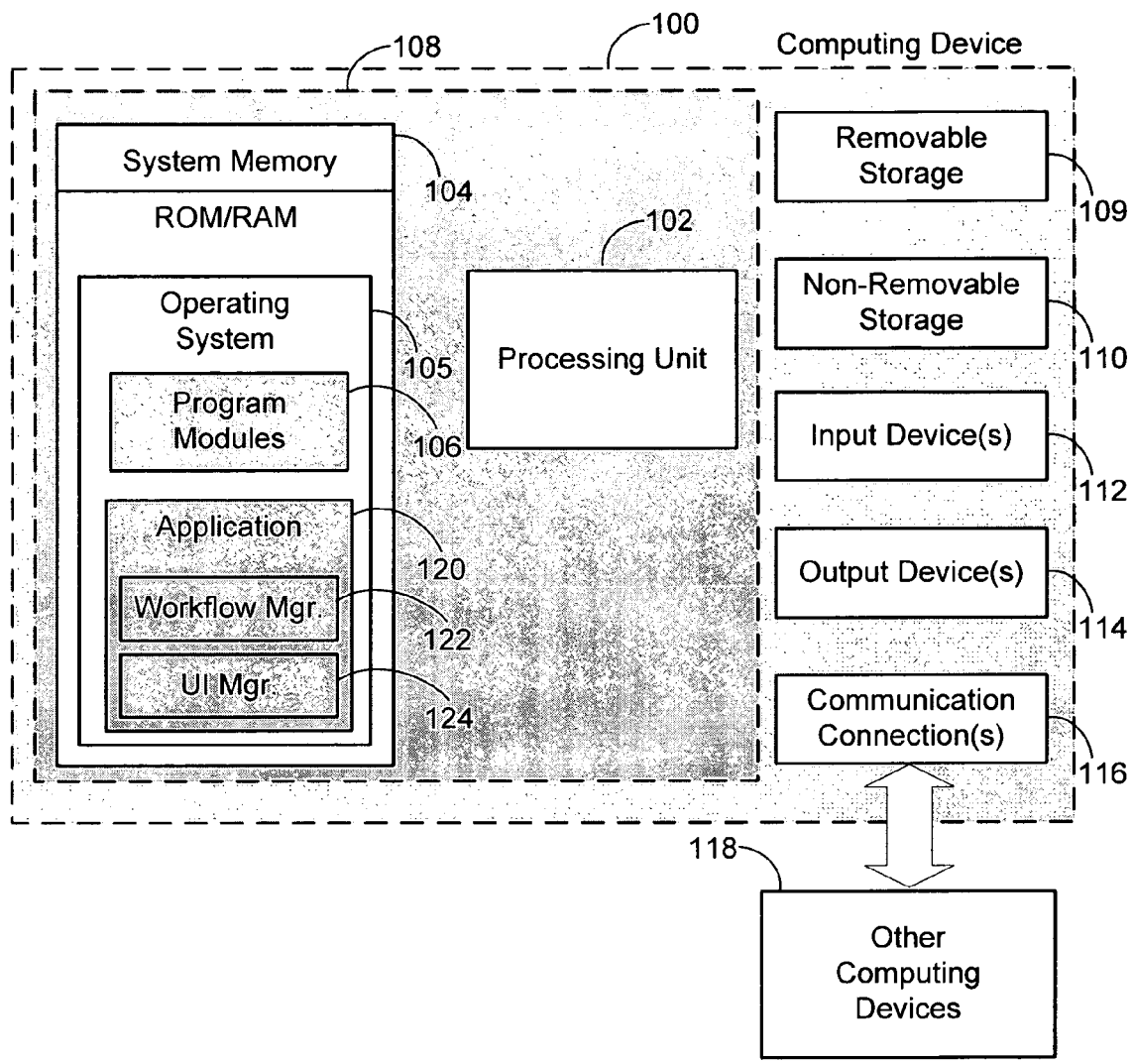
FIG. 1 illustrates a computing device in which an application exchanging data between a workflow and a user interface using databinding constructs may be executed.

Referring to FIG. 1, an exemplary system for implementing some embodiments includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, and the like.) or some combination of the two. System memory 104 typically includes operating system 105 and one or more program modules 106 working within operating system 105.

In addition to program modules 106, application 120 may also be executed within operating system 105. Application 120 may be any process-oriented application that employs workflow instances and user interfaces to perform actions associated with a process. Application 120 may include or interact with workflow manager 122 that handles loading, execution, suspension, and resumption of workflow instances. Application 120 may further include or interact with user interface manager 124 that handles loading, initiating, resuming, and the like of user interface instances.

In one embodiment, application 120 may facilitate data exchange between one or more instances of the workflow and the user interfaces to populate user interface screens and provide user input to the workflow for continued processing. To perform the actions described above, application 120 may include and/or interact with other computing devices, applications, and application interfaces (APIs) residing in other applications.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data.

System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as retail devices, keyboard, mouse, pen, voice input device, touch input device, and the like. Output device(s) 114 such as a display, speakers, printer, and the like may also be included.

Computing device 100 also contains communication connections 116 that allow the device to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Figure 2:
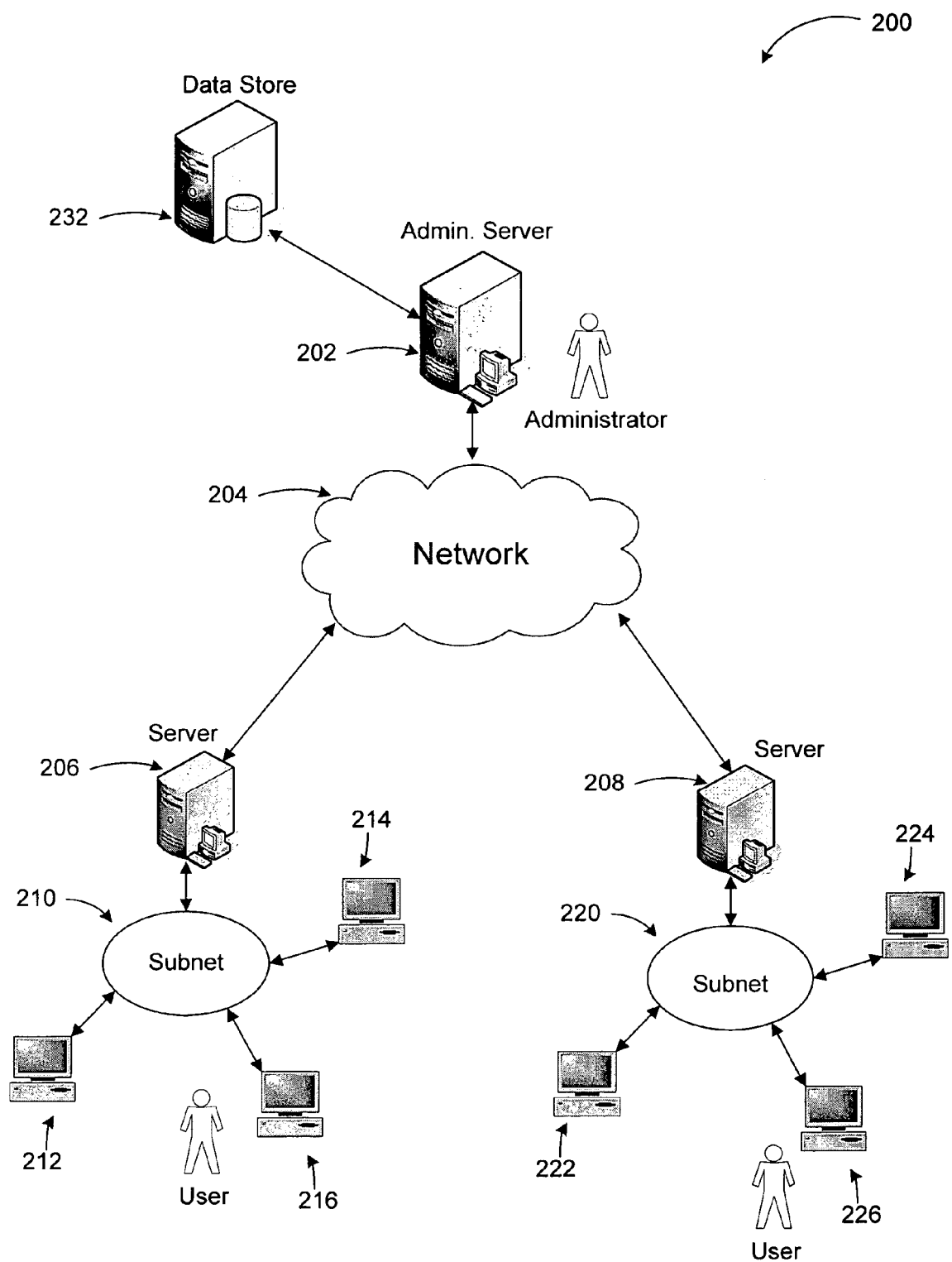
FIG. 2 illustrates an example system, where aspects of a system exchanging data between workflow and user interface may be implemented.

FIG. 2 illustrates example system 200, where aspects of exchanging data between workflow and user interface may be implemented. System 200 may include one or more networks that comprise any topology of servers, clients, Internet service providers, and communication media. The networks may also have a static or dynamic topology.

An application executing a process that involves a workflow and associated user interfaces, such as application 120 of FIG. 1, may reside on any computing device such as server (e.g. servers 202, 206, and 208). In some implementations, the application may be a distributed application residing on multiple servers. In other implementations, multiple applications may execute a workflow in a coordinated manner.

While executing the workflow, the application may provide the user interface(s) to client devices (e.g. client devices 212-216 and 222-226) where users can provide input. As described in more detail below, an instance of the workflow may be suspended when a user input event is encountered and an instance of the user interface activated. Activating the user interface may include at least one of: loading, initiating, and resuming the user interface. The instance of the user interface may be populated employing data provided by the workflow using databinding constructs.

Once the user provides an input, another instance of the workflow with the same GUID may be loaded and data associated with the user input may be provided to the workflow using databinding constructs. The application can then continue executing the workflow with the data provided by the user. In one embodiment, the workflow may resume if the user input results in no data being provided to the workflow from the user interface or after a predetermined time-out.

In some embodiments, the user input may trigger retrieval of other data from a data store (e.g. data store 232). For example, in an electronic mail application, a workflow instance for composing an email message may activate a user interface prompting the user to enter a destination address, a subject line, and the like. While data such as destination address may be provided directly by the user interface to the workflow using a databinding construct, other data such as an attachment file may be provided indirectly by prompting the workflow to retrieve the attachment file from a specified location.

In yet other embodiments, an administrator may manage one or more workflows. Network 204 and subnets 210, 220 may be secure networks such an enterprise network, or unsecure network such as a wireless open network. Network 204 and subnets 210, 220 provide communication between the nodes described above. By way of example, and not limitation, network 204 and subnets 210, 220 may include wired media such as a wired network or direct-wired connection, and wireless media such as acoustic, RF, infrared and other wireless media.

The present invention is not limited to the above-described environment, however. Many other configurations of computing devices, communications, applications, and distribution systems may be employed to implement an application executing a workflow and associated user interfaces using databinding constructs foe exchanging data.

Illustrative Embodiments for Exchanging Data Between Workflow and User Interface Using Databinding Constructs Workflow is procedural: it describes how a process is to be run. By contrast, the state machine representation of a process is declarative; to define a process is to declare its states and transitions. There are advantages and disadvantages to each approach. For example, workflow is easier for a business analyst to understand, but being procedural it requires more code and is less compact than a state model. But workflow and the state machine are not mutually exclusive, and when used in concert, they can produce powerful solutions.

Workflow can execute background tasks as well as foreground tasks that may require human interaction. For such tasks an associated user interface may be activated to receive user input. Commonly, custom code is written to provide data from the user interface to the workflow as well as from the workflow to the user interface. The data from the workflow is used to populate fields within the user interface that are associated with the process executed by the workflow.

Embodiments of the present invention are directed to using databinding constructs for exchanging data between the workflow and associated user interfaces. Databinding is typically used within applications to take advantage of data stored in databases, arrays, tables, collections, and the like. According to embodiments, data to populate the user interface is transferred from the workflow using one type of databinding construct (e.g. read only). Once user input is received, data associated with the user input is provided from the user interface to the workflow using another type of databinding construct (e.g. read/write).

Figure 3:
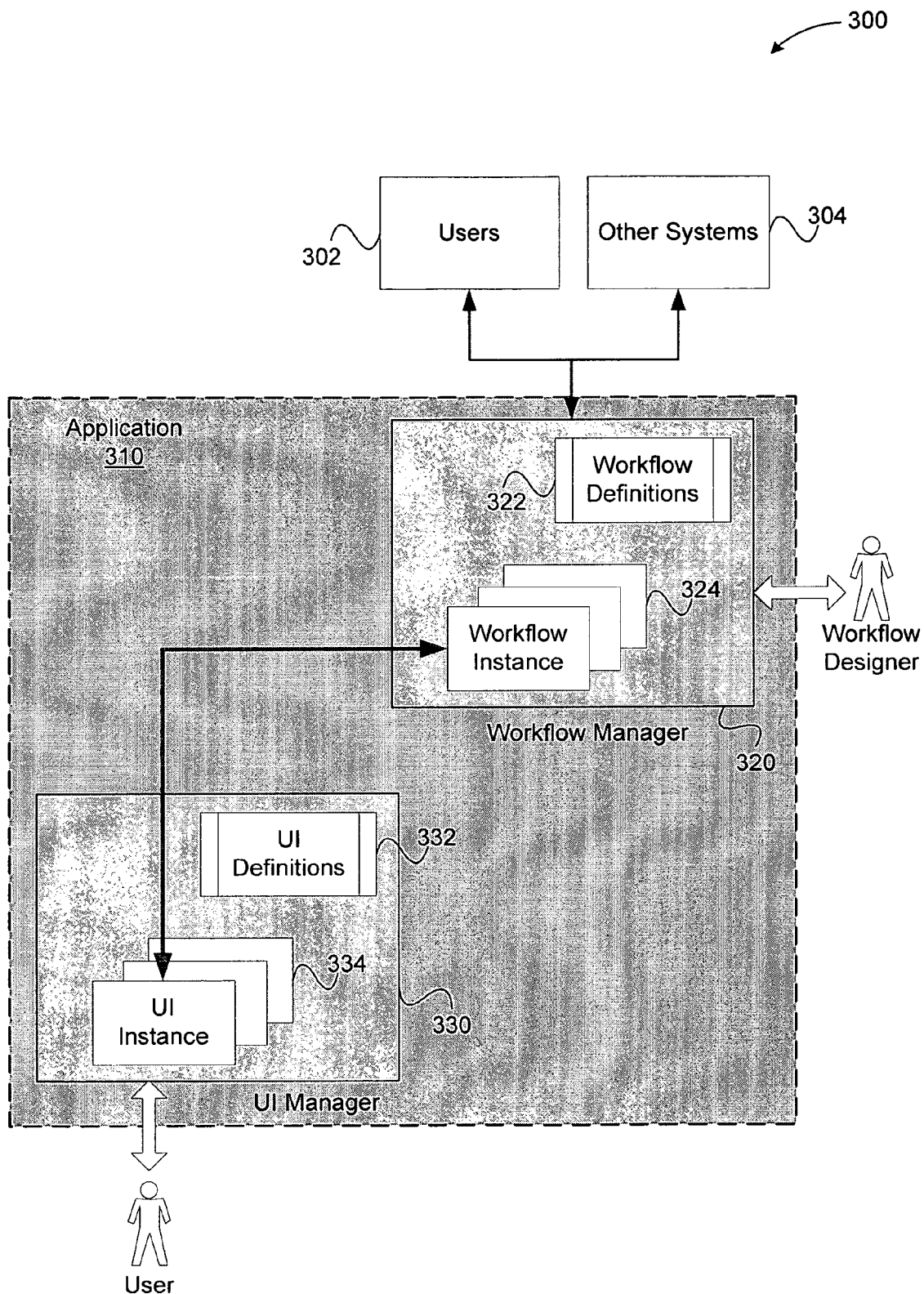
FIG. 3 is a block diagram illustrating interactions between a workflow system and a user interface system within an application.

FIG. 3 is a block diagram illustrating interactions between a workflow system and a user interface system within an application. Diagram 300 includes application 310 including workflow manager 320 and UI manager 330, users 302, and other systems 304.

Workflow manager 320 manages workflow definitions 322 and workflow instances 324. A workflow designer may input and/or modify workflow definitions 322 characterizing content and order of workflow instances for a process to be executed by application 310. Workflow instances 324 may be executed such that an ordered sequence of the workflow instances comprise a process involving ordered sequential user interaction with user interface instances 334 associated with the corresponding workflow instances.

Similarly, user interface manager 330 manages user interface definitions 332 and user interface instances 334. User interface instances 334 may be presented as part of a web page, a console application, a desktop application, a form, or a presentation. User interface definitions 332 define a structure of user interface instances 334. Actual data populating user interface instances 334 may be received from workflow instances 324 using databinding constructs.

For example, in an electronic mail application, user interface instances may include screens for composing an email, replying to an email, forwarding an email, and the like. While user interface definitions 332 may provide the forms for those screens, data such as destination address, subject line, courtesy copy addresses, content of email, and the like may be provided by workflow instances 324.

Figure 5:
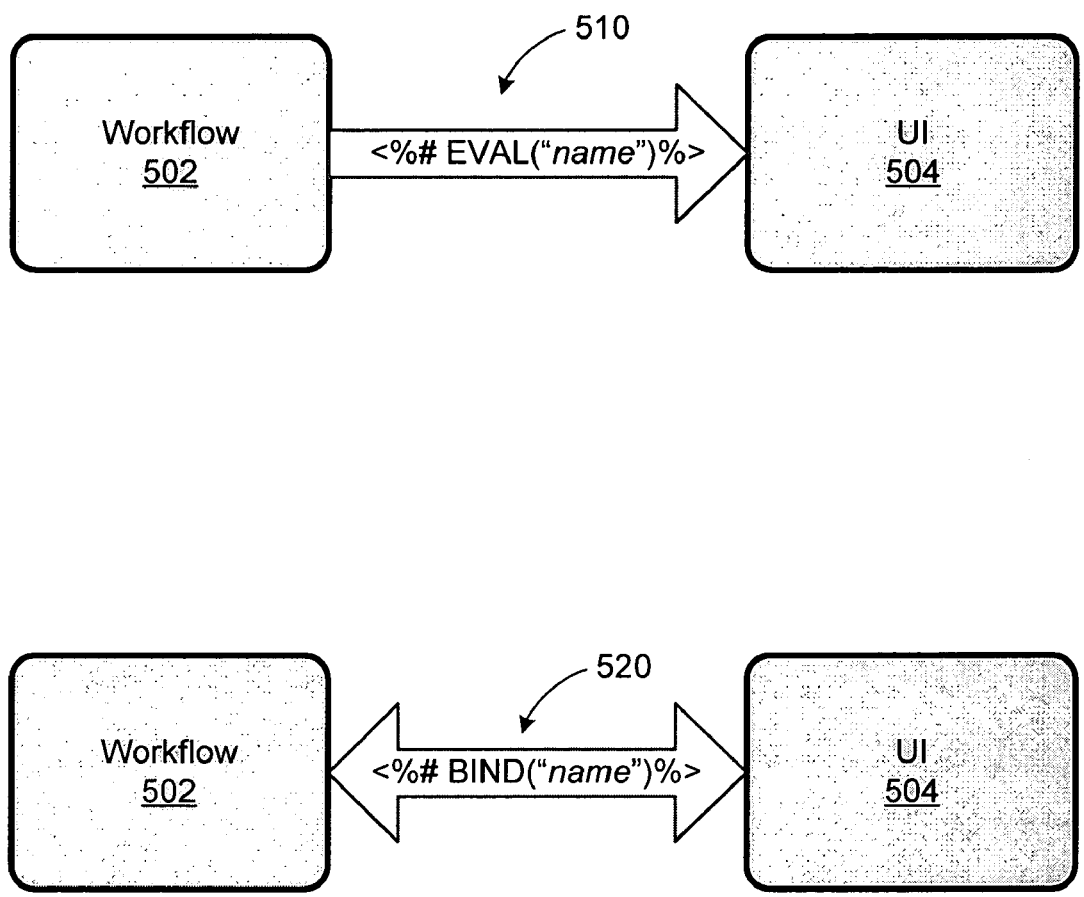
FIG. 5 illustrates two example databinding constructs for exchanging data between workflow and user interface.

On the reverse side, user interface instances 334 provide data associated with a user input to workflow instances 324. In the above example, such data may include a new destination address provided by the user, a button selection such as clicking on the "SEND" button, and the like. The same or other types of databinding constructs are used in the reverse transfer of data from user interface instances 334 to workflow instances 324. Two example constructs for exchanging data between workflow instances 324 and user interface instances 334 are illustrated in FIG. 5.

Application 310 may also interact with other systems such as databases, network communication systems, and the like. Furthermore, application 310 may also receive input or provide output to other users (302). Application 310 may also facilitate sharing context information between instances of the workflow corresponding to different user interface instances.

Figure 4:
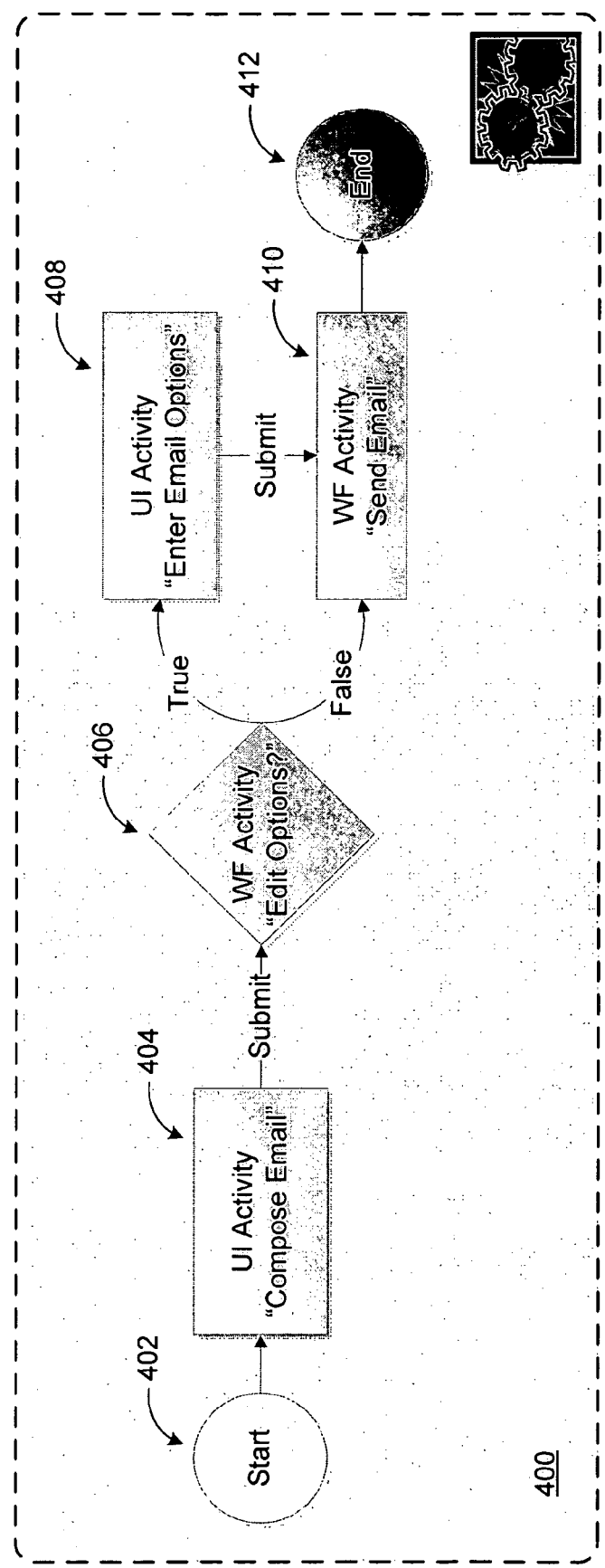
FIG. 4 is a diagram illustrating a set of workflow and user interface activities associated with an example process.

FIG. 4 is a diagram illustrating a set of workflow and user interface activities associated with an example process. Workflow and user interface activities are shown in electronic mail application 400.

First example activity, user interface activity 404 for composing an email, follows start 402. User interface activity 404 may be activated by a workflow process already being executed by application 400. Once a user input is received by user interface activity 404, such as clicking on the "COMPOSE" button, the input is submitted to workflow activity 406 via databinding.

Workflow activity 406 receives from UI activity 404 instructions as to whether any options are to be edited. If there are any options to be edited ("true"), the process moves to user interface activity 408, which provides the user with a screen to enter email options such as priority level, receipt confirmation, and the like. If there are no options to be edited ("false"), the process moves to workflow activity 410. Workflow activity 410 sends the email message completing the process at end 412.

The invention is not limited to the example operations described above. Other components and operations may be implemented using the principles described herein.

FIG. 5 illustrates two example databinding constructs for exchanging data between workflow and user interface. The databinding construct may be a declarative construct or an imperative construct. Moreover, the databinding construct may define a specific portion of data between two end points.

The databinding construct may be defined for transferring data from the workflow to the user interface, for transferring data from the user interface to the workflow, or transferring data between the workflow and the user interface in both directions.

As diagram 500 shows, databinding construct 510 is named "EVAL." Symbols %# indicate a databinding construct is being used followed by a name assigned to the data. Databinding construct 510 "EVAL" is used to transfer data in one direction, from workflow 502 to user interface 504.

Databinding construct 520 "BIND" defined similarly and used to transfer data in two directions between workflow 502 to user interface 504.

The invention is not limited to the example databinding constructs discussed above. Other databinding constructs including those with various functional or structural limitations may be implemented using the principles described herein.

FIG. 6 illustrates example code 600 for an electronic mail application using workflow and user interface instances.

Example code 600 is for an electronic mail application and begins with line 602 calling ordered user interface sequence UIFlowContainer that is run at "server." Workflow "SendMail" is referenced in line 604.

Following the workflow definition are two user interfaces. User interface StartTemplate is coded in lines designated by reference numeral 606. StartTemplate includes a command for activating the workflow (Startworkflow) if a button is clicked on by the user. If the user clicks on the button, actions within the workflow "SendMail" are performed.

The second user interface is coded in lines designated by reference numeral 608. The user interface named "CompleteTemplate" provides the user the message "your mail was sent" upon completion of the "SendMail" workflow and asks whether the user wants to send another mail. If the user makes the selection for another mail, a new instance of workflow "SendMail" is created using the same definition.

Next section of example code 600 includes lines designated by reference numeral 614 that include a number of user interface activities. The first activity is for composing an email as defined in line 610. The destination address indicated by ToTextbox is one of the groups of data collected by this user interface. Data entered by the user for destination address is complemented with databinding construct BIND in line 612, as explained in FIG. 5 above, for transferring to the workflow instance for composing the email.

The user interface may include further actions such as resuming the workflow or canceling the workflow (e.g. line 616). Other user interface activities such as one for editing mail options (OPTION) defined in line 618 may include further examples of databinding constructs to transfer data to the workflow.

Figure 7A:
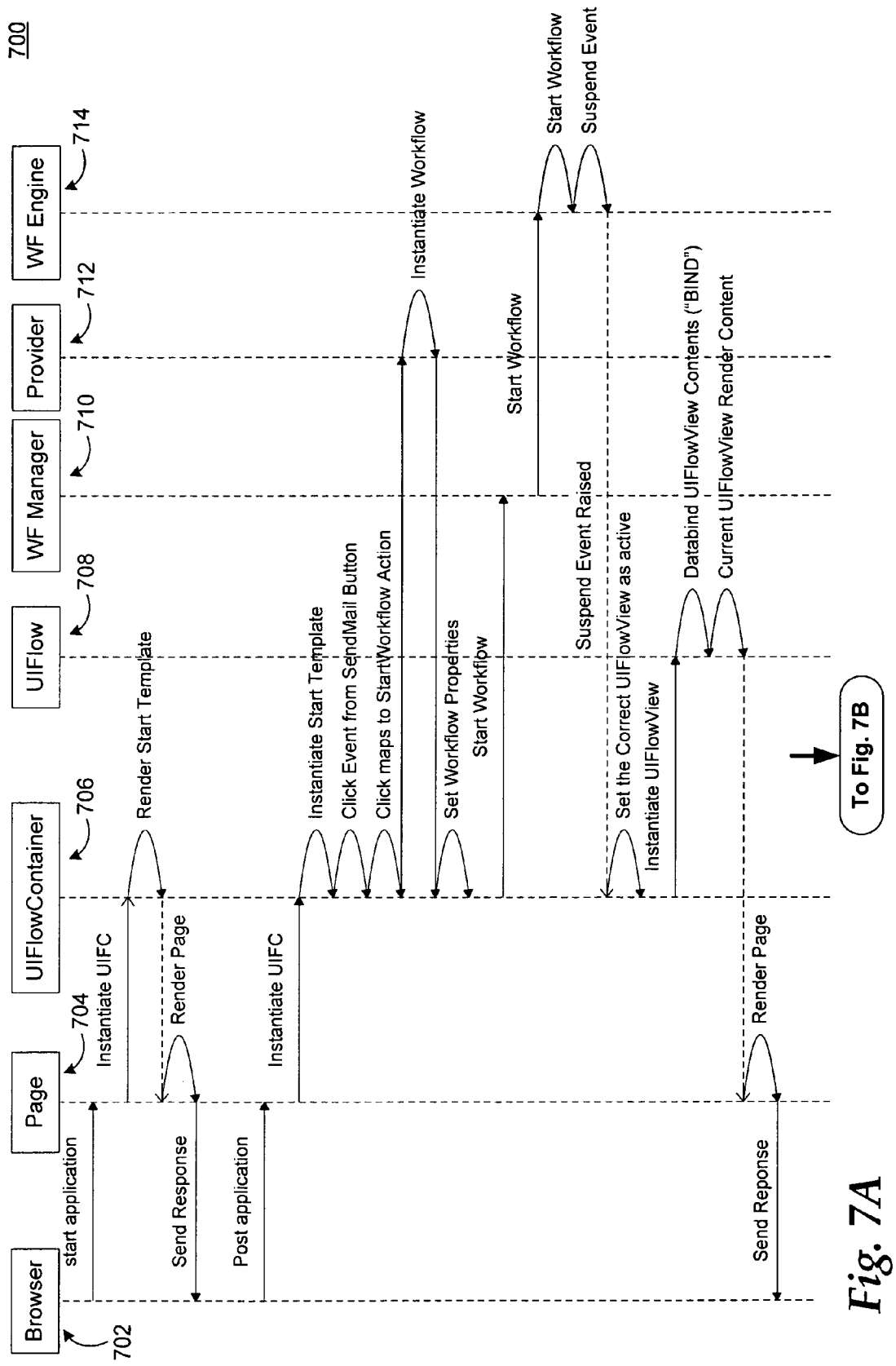
FIGS. 7A and 7B are a diagram illustrating actions associated with the example application of FIG. 6.
Figure 7B:
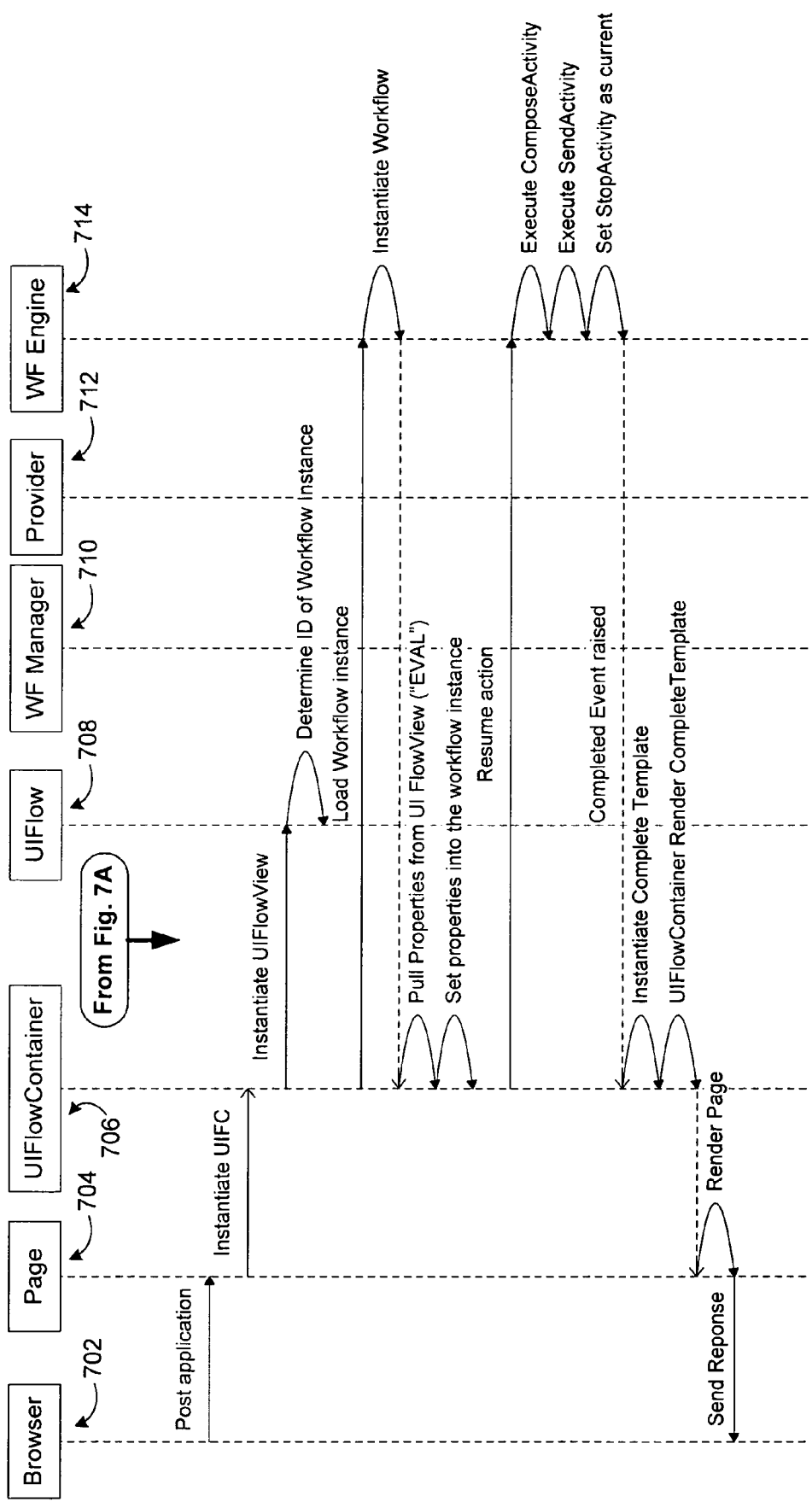

FIG. 7A and 7B illustrate diagrams 700 and 750 including actions associated with the example application of FIG. 6.

The electronic mail application of FIG. 6 is executed in a browser. In diagram 700 of FIG. 7A, browser 702 starts the application prompting web page 704 to instantiate user interface flow container (UIFC) 706, which renders the start template. Following the rendering of the start template, the page is rendered and a response sent to the browser.

The browser posts the application to the page once again instantiating the UIFC. The UIFC instantiates the start template and waits for a click event from SendMail button. The page is executed on a single thread. Upon detecting the click event, the UIFC maps the click to a StartWorkflow action. This is the activity included in lines designated by reference numeral 606 of the example code of FIG. 6.

Next, the UIFC instantiates the workflow managed by workflow manager 710 and originated by a provider (712). In some embodiments, workflow properties may be set before the workflow is started. Workflow properties may be provided by a workflow definitions file such as workflow definitions 322 of FIG. 3.

After setting the workflow properties, the UIFC triggers starting of the workflow, which is executed by the workflow engine (714). The workflow is executed until a suspend event is encountered. If a suspend event is raised, the workflow engine prompts the UIFC to select a corresponding user interface instance and to instantiate the user interface view.

Contents for the new user interface view, such as default options, default signature section for the message, and the like, are transferred to the user interface instance using the databinding construct "BIND", which is used to transfer data in both directions between the workflow and the user interface. Upon receiving the content data, the user interface view is rendered prompting the page to be rendered and a response sent to the browser. Actions associated with the electronic mail application continue on diagram 750.

Diagram 750 of FIG. 7B begins with the browser posting the application and prompting the page to instantiate the UIFC. In response, the user interface flow view is instantiated. Upon receiving a user input, such as making selections, entering text, clicking on a button, and the like, an identifier of a workflow instance associated with the user input is determined.

The determined workflow instance is loaded by the user interface flow (708) and instantiated by the workflow engine. The UIFC pulls data provided by the user, such as entered text, from the user interface using the construct "EVAL", which is used to transfer data from the workflow to the user interface. As before, properties of the workflow instance may be set and the workflow may resume action.

Upon completion of the activities, the workflow engine may raise a "completed" event, which prompts the UIFC to instantiate a completion template. The UIFC may then render the completion template. Rendering of the completion template may be followed by rendering of the page and sending a response to the browser.

The invention is not limited to the example application and operations described in conjunction with FIGS. 6, 7A, and 7B above. Other components and operations may be implemented using the principles described herein. Furthermore, aspects may be implemented in an arbitrarily complex workflow system.

Figure 8:
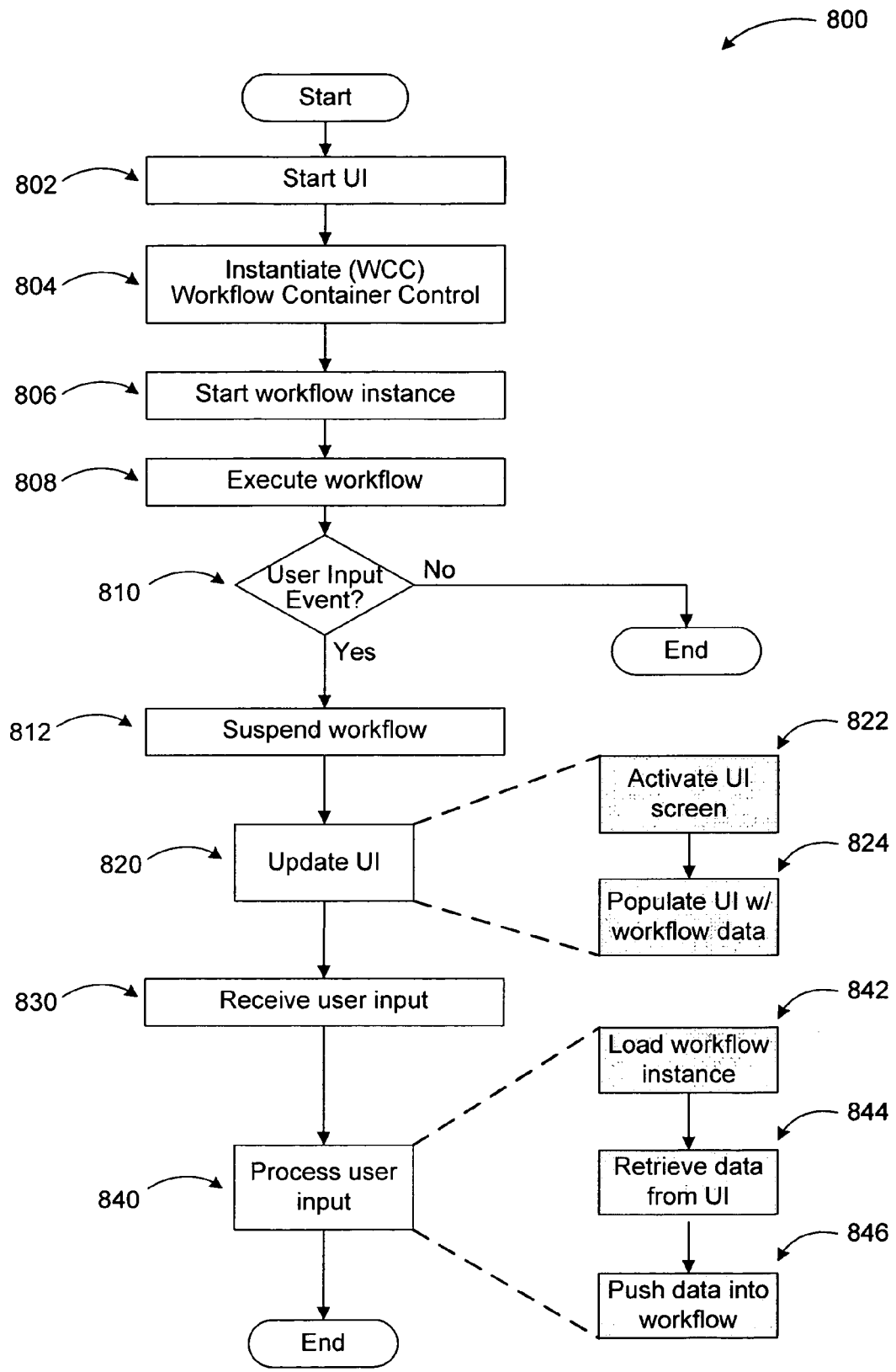
FIG. 8 illustrates a logic flow diagram for a process of exchanging data between workflow and user interface using databinding constructs.

FIG. 8 illustrates a logic flow diagram for process 800 of exchanging data between workflow and user interface using databinding constructs.

Process 800 begins with operation 802, where the user interface for the application that includes the workflow is started. Processing moves next to operation 804.

At operation 804, workflow container control (WCC) is instantiated. WCC manages loading, execution, resumption, and the like, of different instances of the workflow. Processing advances from operation 804 to operation 806.

At operation 806, an instance of the workflow is started, which is followed by operation 808, where the workflow instance is executed. Processing moves from operation 808 to decision operation 810.

At decision operation 810, a determination is made whether a user input event is encountered. If the determination is negative, the workflow is executed until it is completed and the process ends. On the other hand, if a user input event is encountered, processing moves to operation 812.

At operation 812, the workflow is suspended, and processing advances to operation 820 where the user interface is updated. The updating process of the user interface may include a sub-process comprising two operations.

At operation 822, the user interface screen is activated. Activating the user interface screen may include at least one of loading, initiating, and resuming the user interface screen. Processing advances from operation 822 to operation 824.

At operation 824, the user interface is populated with workflow data. The workflow data may be transferred from the workflow to the user interface using databinding constructs as explained in conjunction with FIGS. 4, 5, and 6.

Processing moves from operation 820 to operation 830, where a user input is received. The user input may take any form such as clicking on a button, entering text, making a selection in a menu, and the like. Some user inputs may trigger a user interface activity affecting the workflow without exchanging data (e.g. canceling or resuming the workflow). Other user inputs may necessitate providing data associated with the user input (e.g. entered text) to the workflow. Yet, further user inputs may prompt the user interface to direct the workflow to retrieve data from another source. Processing moves from operation 830 to operation 840.

At operation 840, the user input is processed. As described above, the user input may be associated with a number of actions. In the example of user input necessitating transfer of data to the workflow, operation 840 may include three sub-operations.

Operation 840 may begin with sub-operation 842, where another instance of the workflow is loaded. Processing advances from sub-operation 842 to sub-operation 844.

At sub-operation 844, data is retrieved from the user interface using the same or another type databinding construct. Example databinding constructs are described in conjunction with FIG. 5. Processing moves from sub-operation 844 to sub-operation 846, where the data is transferred to the workflow.

Operation 840 completes with execution of the workflow using the data received from the user interface. Processing then proceeds to a calling process for further actions.

The operations included in process 800 are for illustration purposes. Using databinding constructs for exchanging data between workflow and user interface in an application may be implemented by a similar process with fewer or additional steps, as well as in different order of operations.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-implemented method for exchanging data between a pregenerated workflow process and a user interface, comprising:

activating a user interface sequence associated with a pregenerated workflow process:

executing an instance of the workflow process associated with the user interface, wherein the instance of the workflow process is a sequential instance for causing the execution of a portion of the workflow process;

suspending the workflow process to receive user input;

setting properties pulled from the user interface into the instance of the workflow;

resuming the workflow if the received user input results in no data being provided to the workflow from the user interface;

providing data from the workflow to the user interface, wherein the data is provided by employing a one-directional databinding construct for transferring the data from the workflow process to the user interface and cause execution of the workflow process, wherein the one-directional databinding construct includes a databinding identifier that indicates one-directional data binding and a data identifier that identifies the data as being bound by the one-directional databinding construct to cause the execution of the workflow process;

upon receiving user input loading another instance of the workflow;

retrieving data associated with the user input from the user interface; and providing the data associated with the user input from the user interface to the workflow process, wherein the data is provided by employing a two-directional databinding construct for transferring the data between the user interface and the workflow process in both directions to cause execution of the workflow process, wherein the two-directional databinding construct includes a databinding identifier that indicates two-directional data binding and a data identifier that identifies the data as being bound by the two-directional databinding construct to cause the execution of the workflow process.

2. The computer-implemented method of claim 1, wherein activating the user interface sequence includes at least one of: loading, initiating, and resuming the user interface sequence.

3. The computer-implemented method of claim 1, wherein the one-directional databinding construct defines a specific portion of data between two end points of the workflow process.

4. The computer-implemented method of claim 1, wherein the user interface includes one of: a web page, a console application, a desktop application, a form, and a presentation.

5. The computer-implemented method of claim 1, further comprising providing additional data associated with the user input from a data store to the workflow process.

6. The computer-implemented method of claim 1, further comprising sharing context information between instances of the workflow process corresponding to different user interface instances.

7. The computer-implemented method of claim 1, wherein the one-directional databinding construct is bound to a field of an email template to cause the execution of the email template according to the one-directional databinding construct.

8. The computer-implemented method of claim 1, wherein the two-directional databinding construct is bound to an input field of an email template to cause data input into the input filed to be bound by the two-directional databinding construct and cause execution of the workflow process in accordance with the data input bound by the two-directional databinding construct.

9. A computer storage media having computer instructions encoded thereon for facilitating data exchange between a pregenerated workflow process and a user interface layer using databinding constructs, the instructions comprising:

activating a user interface instance by at least one from a set of: loading, initiating, and resuming an instance of the user interface;

executing an instance of the workflow process associated with the user interface, wherein the instance of the workflow process is a sequential instance for causing the execution of a portion of the workflow process;

suspending the workflow to receive user input;

setting properties pulled from the user interface into the instance of the workflow;

resuming the workflow if the received user input results in no data being provided to the workflow from the user interface;

providing data from the workflow to the user interface, wherein the data is provided by employing a one-directional databinding construct for transferring the data from the workflow process to the user interface and cause execution of the workflow process, wherein the one-directional databinding construct includes a databinding identifier that indicates one-directional data binding and a data identifier that identifies the data as being bound by the one-directional databinding construct to cause the execution of the workflow process;

upon receiving user input loading another instance of the workflow;

retrieving data associated with the user input from the user interface; and providing the data associated with the user input from the user interface to the workflow process, wherein the data is provided by employing a two-directional databinding construct for transferring the data between the user interface and the workflow process in both directions to cause execution of the workflow process, wherein the two-directional databinding construct includes a databinding identifier that indicates two-directional data binding and a data identifier that identifies the data as being bound by the two-directional databinding construct to cause the execution of the workflow process.

10. The computer-implemented method of claim 1, wherein the two-directional databinding construct is bound to an input field of the email template to cause data input into the input field to be bound by the two-directional databinding construct and cause execution of the workflow process in accordance with the data input bound by the two-directional construct.

11. The computer storage media of claim 9, wherein the one-directional databinding construct is bound to a field of an email template to cause the execution of the email template according to the one-directional databinding construct.

12. The computer storage media of claim 11, wherein the instructions further comprise determining whether the user input is associated with data to be provided to the workflow process, and resuming the other workflow instance if the user input is not associated with data to be provided to the workflow process.

13. The computer storage media of claim 11, wherein the one-directional databinding construct is an "EVAL" databinding construct for transferring data from the workflow process to the user interface and the two-directional databinding construct is a "BIND" databinding construct for transferring data between the workflow process and the user interface in both directions.

14. The computer storage media of claim 11, wherein the instructions further include executing instances of the workflow process such that an ordered sequence of the workflow instances comprise a process involving ordered sequential user interaction with the user interface instances associated with the corresponding workflow instances.

15. A system for facilitating data exchange between a pregenerated workflow process and a user interface using databinding constructs, the system comprising:

a memory;

a processor coupled to the memory, the processor configured to execute an application, wherein the application includes:

a workflow engine configured to perform actions including:
  loading an instance of the workflow process;
  executing the instance of the workflow process;
  upon encountering a user input event, suspending the workflow process;
  providing data from the workflow to the user interface, wherein the data is provided by employing a one-directional databinding construct for transferring the data from the workflow process to the user interface and cause execution of the workflow process, wherein the one-directional databinding construct includes a databinding identifier that indicates one-directional data binding and a data identifier that identifies the data as being bound by the one-directional databinding construct to cause the execution of the workflow process;
  upon receiving data associated with the user input setting properties pulled from the user interface into the instance of the workflow process and continuing execution of the workflow process;
  if user input received from the user interface results in no data being provided to the workflow process from the user interface, still resuming the workflow process; and
a user interface layer configured to perform actions including:
  upon detecting the suspension of the workflow process instantiating the user interface;
  receiving data associated with the workflow process such that the user interface is populated with the data associated with the workflow process; and
  upon receiving the user input, providing the data associated with the user input from the user interface to the workflow process, wherein the data is provided by employing a two-directional databinding construct for transferring the data between the user interface and the workflow process in both directions to cause execution of the workflow process, wherein the two-directional databinding construct includes a databinding identifier that indicates two-directional data binding and a data identifier that identifies the data as being bound by the two-directional databinding construct to cause the execution of the workflow process.

16. The system of claim 15, further comprising a data store configured to store additional data associated with the workflow process and the user interface.

17. The system of claim 15, wherein the workflow engine is further configured to receive data from a data store associated with the user input upon receiving the data associated with the user input from the user interface.

18. The system of claim 15, wherein the workflow engine is further configured to share context information between instances of the workflow process corresponding to different user interface instances.

19. The system of claim 15, wherein the workflow engine is further configured to one of terminate and continue to execute the workflow process after a predetermined time-out.

* * * * *

UNITED STATES PATENT AND TRADEMARK OFFICE
CERTIFICATE OF CORRECTION

| | | |
|---|---|---|
| PATENT NO. | : 7,606,824 B2 | Page 1 of 1 |
| APPLICATION NO. | : 11/273366 | |
| DATED | : October 20, 2009 | |
| INVENTOR(S) | : Andres Mauricio Sanabria et al. | |

It is certified that error appears in the above-identified patent and that said Letters Patent is hereby corrected as shown below:

In column 8, line 57, in Claim 1, delete "process:" and insert -- process; --, therefor.

In column 9, line 52, in Claim 8, delete "filed" and insert -- field --, therefor.

In column 10, line 37, in Claim 10, before "construct" insert -- databinding --.

In column 10, line 42, in Claim 12, delete "11" and insert -- 9 --, therefor.

In column 10, line 48, in Claim 13, delete "11" and insert -- 9 --, therefor.

In column 10, line 55, in Claim 14, delete "11" and insert -- 9 --, therefor.

Signed and Sealed this
Eighth Day of February, 2011

David J. Kappos
*Director of the United States Patent and Trademark Office*